United States Patent [19]

Magari et al.

[11] Patent Number: 4,991,648
[45] Date of Patent: Feb. 12, 1991

[54] MULTI-TUBE TYPE HEAT TRANSFER APPARATUS

[75] Inventors: Akira Magari; Hideaki Nagai; Hiroichi Kurita, all of Tokyo; Kazuto Kobayashi, Hiroshima, all of Japan

[73] Assignee: Mitsubishi Jukogyo Kabushiki Kaisha, Tokyo, Japan

[21] Appl. No.: 476,548

[22] Filed: Feb. 7, 1990

[30] Foreign Application Priority Data

| Feb. 10, 1989 | [JP] | Japan | 1-29950 |
| Feb. 10, 1989 | [JP] | Japan | 1-29951 |
| Nov. 15, 1989 | [JP] | Japan | 1-294971 |

[51] Int. Cl.$^5$ ............................................. F28F 9/22
[52] U.S. Cl. ................................... 165/159; 165/161
[58] Field of Search ........................... 165/159–161, 165/162

[56] References Cited

U.S. PATENT DOCUMENTS

| 827,479 | 7/1906 | Towne | 165/159 |
| 3,566,961 | 3/1971 | Lorenz et al. | 165/159 |
| 4,256,783 | 3/1981 | Takada et al. | 422/197 |
| 4,709,756 | 12/1987 | Wilson et al. | 165/162 |
| 4,749,031 | 6/1988 | Fukumoto | 165/159 |

FOREIGN PATENT DOCUMENTS

| 2657666 | 12/1977 | Fed. Rep. of Germany | 165/159 |
| 514024 | 2/1920 | France | 165/160 |
| 1198370 | 12/1985 | U.S.S.R. | 165/159 |
| 4643 | of 1890 | United Kingdom | 165/159 |

Primary Examiner—Alan Cohan
Assistant Examiner—Allen J. Flanigan
Attorney, Agent, or Firm—Wenderoth, Lind & Ponack

[57] ABSTRACT

A multi-tube type heat transfer apparatus includes a plurality of heat transfer tubes disposed in parallel to each other within a shell wall. A plurality of holes having a larger diameter than the outer diameter of the heat transfer tubes are provided in each of a plurality of baffle plates disposed at intervals within the shell wall. The heat transfer tubes extend through the respective holes. A flow passageway of fluid on the side of the shell is composed of annular spaces formed between the outer circumference of the heat transfer tubes and the inner circumferences of the holes in the baffle plates. Preferably the inner diameters of the plurality of holes in the respective baffle plates are different in different regions of the plate, and thereby the cross-sectional areas of the flow passageways of the fluid on the side of the shell between the outer circumferences of the heat transfer tubes and the inner circumferences of the holes in the baffle plates are different in different areas of the apparatus to provide a desired flow distribution of the shell side fluid.

12 Claims, 15 Drawing Sheets

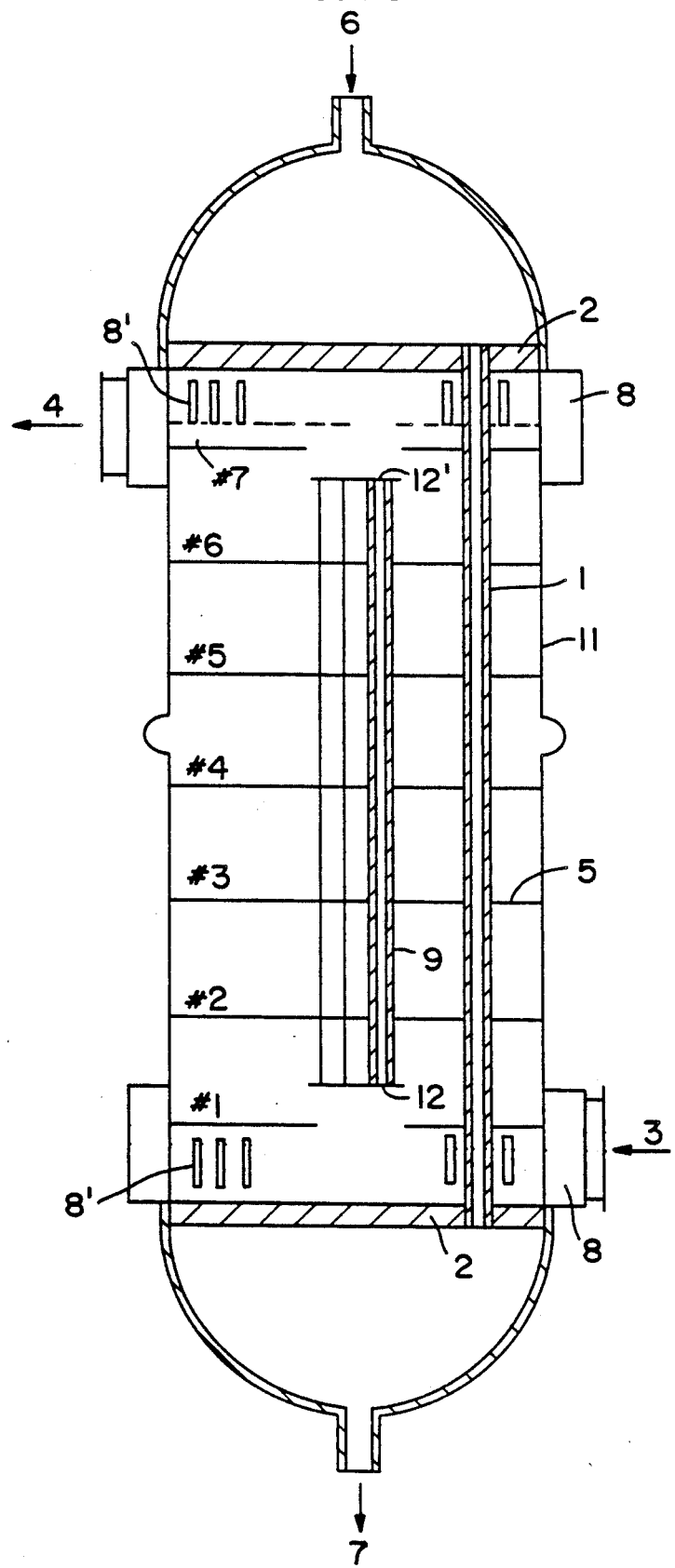

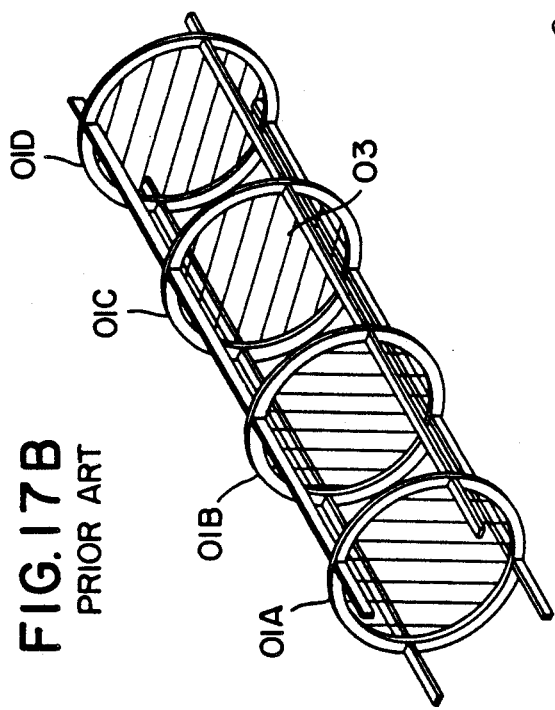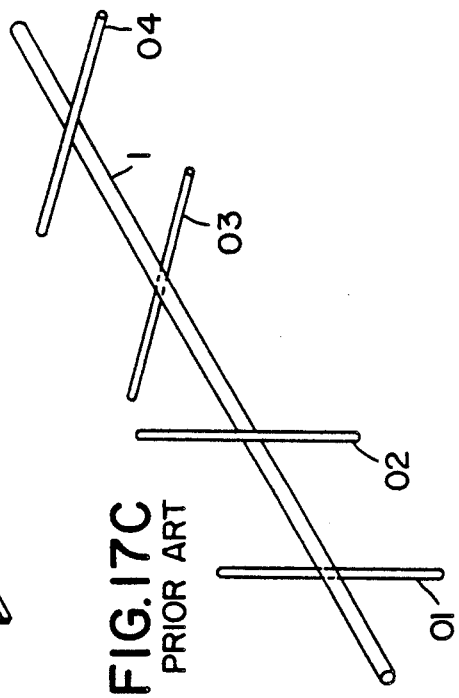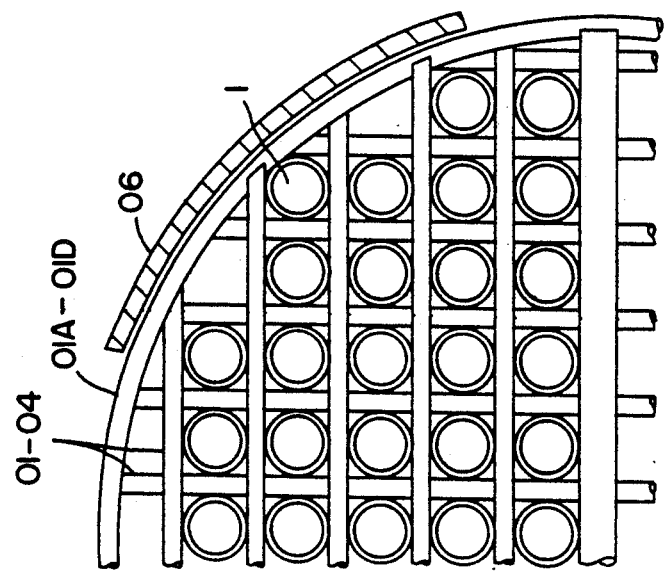

MULTI-TUBE TYPE HEAT TRANSFER APPARATUS

BACKGROUND OF THE INVENTION

1. Field of the Invention

The present invention relates to a multi-tube type heat transfer apparatus in which a heat-exchange medium flows on the side of a shell of the apparatus to perform cooling or heating of heat transfer tubes, which apparatus is available, for instance, in a multi-tube type acrylic acid reactor or in a multi-tube type heat-exchanger.

2. Description of the Prior Art

In the following, description will be made of a multi-tube type heat transfer apparatus in the prior art, by way of example, in connection to an acrylic acid reactor.

Heretofore, in the synthesis of acrylic acid by oxidizing propylene, propylene is subjected to catalytic oxidation at a high temperature in gaseous phase under existence of steam in a tubular reactor packed with molybdenum group catalyst to produce acrolein. Subsequently acrolein is oxidized into acrylic acid, and in order to remove the heat of reaction generated at that time and also to effectively utilize the heat, provision is made such that a heat medium such as molten salt of a nitrate group may be circulated outside of the catalytic reaction tubes in the reactor apparatus. Such a type of reactor apparatus in the prior art is shown in FIG. 14.

In FIG. 14, a plurality of reaction tubes (heat transfer tubes) 1 packed with a catalyst and disposed in parallel to one another are fixed by upper and lower header plates 2. A heat medium serving as shell side fluid is introduced into a reactor shell 11 through an inlet nozzle 3 at the lower portion of the reactor shell 11, and after reaction heat has been recovered, the heat medium is discharged through an outlet nozzle 4 at the upper portion of the reactor shell 11. At that time, in order to improve the heat transfer performance of the heat medium, a plurality of baffle plates 5 are disposed within the reactor shell 11. The arrangement is such that raw material gas formed by mixing heated fluid propylene with air may flow into the reaction tubes 1 from the above through a nozzle 6, and after acrylic acid has been produced in the tubes 1 it is discharged through a nozzle 7.

In the above-described reactor apparatus in the prior art, for the purpose of enhancing a heat-exchange proportion of the shell side fluid, baffle plates or rods as shown in FIGS. 15, 16 and 17 were disposed.

FIG. 15 shows a most generally used baffle plate of a partly broken circular shape. Partly broken circular plates 5a and 5a' as shown in FIGS. 15(A) and 15(B) are alternately disposed in the direction of flow of the shell side fluid. In the case where such types of baffle plates are applied to a large-sized heat transfer apparatus in which the a number of heat transfer tubes is large and the tube length are large, the following problems are involved:

(1) The heat medium forming the shell side fluid would flow transversely of the heat transfer tubes in the respective flow passageways formed by the respective partly broken circular plates and, having alternately diverted flow directions, and so the flow resistance of the shell side fluid is extremely increased. This means that a high amount of energy is consumed for circulation of the heat medium.

(2) Flow velocity distribution of the shell side fluid becomes uneven. In other words, there is a location where the flow velocity in the axial direction of the reactor shell is large, a location where a flow velocity in the radial direction is large, and a location where the fluid stagnates. Consequently, a large distribution is produced in the shell side heat transfer coefficient. Accordingly uneven distribution would arise in the catalyst reaction temperature, and hence degradation of the catalyst would be quickened and unevenness would arise also in the reaction speed, and the efficiency would be lowered.

FIG. 16 shows another example of the baffle plates, and in this example an annular (doughnut-shaped) plates 5b and circular plates 5b' are alternately disposed along the flow direction of the shell side fluid, that is, circular-/annular-shaped baffle plates are used. In the case of this type of baffle plates, although the pressure loss is reduced as compared to the above-described baffle plates of partly broken circular shape in FIG. 15, the above-mentioned problem (2) is not yet resolved. A distribution is produced in the shell side heat transfer coefficient, and so, this construction is unfavorable, for instance, for a reactor packed with a catalyst having a high temperature-dependent characteristic.

On the other hand, as a type for making the reduction of pressure loss and equalization of the heat transfer coefficient possible, rod baffles as shown in FIG. 17 are known. In this structure, reactor tubes (heat transfer tubes) 1 are supported by four kinds of rods 01–04 mounted to baffle rings 01A–01D, and little disturbance is produced in the shell side fluid flowing in a parallel flow. However, when this is applied to the above-described large-sized reactor or the like, new the following problems arise:

(1) From a structural requirement, the reactor tubes must be disposed in a square array within a reactor apparatus shell 06 as shown in FIG. 17(A), hence the shell diameter becomes large as compared to a triangular array, so that the flow velocity of the fluid is lowered, and accordingly the degree of improvement in the heat transfer coefficient is small.

(2) In order to maintain a heat transfer coefficient, it is necessary to choose small rod arrangement interval, and so, in a reactor having a large reactor tube length the number of rods is extremely increased.

(3) In a large-sized reactor having a large shell diameter, due to bending of the rods, manufacture and assembly become difficult.

(4) Since the heat medium forming a shell side fluid flows in a perfectly parallel flow, in the event that the amount of generated reaction heat in a certain reactor tube should be increased, the temperature rise of the heat medium covering that reactor tube would increase and would act in the direction of further increasing the temperature in the reactor tube, that is, thermal self-stability is not present.

SUMMARY OF THE INVENTION

The present invention has been worked out in order to resolve the above-mentioned problems inherent to a multi-tube type heat transfer apparatus in the prior art, and it is one object of the present invention to provide a multi-tube type heat transfer apparatus that is especially effective as a large-capacity reactor apparatus or heat-exchanger apparatus which is required to have low pressure loss or uniform heat transfer performance.

According to a first feature of the present invention, there is provided a multi-tube type heat transfer apparatus, comprising a shell surrounding a plurality of heat transfer tubes, a plurality of baffle plates disposed at intervals within the shell, each of the baffle plates being provided with a plurality of holes having a larger diameter than the outer diameter of the heat transfer tube, the heat transfer tubes extending through the respective holes in the baffle plates, and a flow passageway of fluid on the side of the shell consisting of annular spaces formed between the outer circumferences of the heat transfer tubes and the inner circumferences of the holes in the baffle plates.

According to a second feature of the present invention, there is provided the first-featured multi-tube type heat transfer apparatus, wherein the inner diameters of the plurality of holes in the respective baffle plates are different in different regions of the plate, and thereby the cross-sectional areas of the flow passageways of the fluid on the side of the shell between the outer circumferences of the heat transfer tubes and the inner circumferences of the holes in the baffle plates are different in different areas of the apparatus to provide a desired flow distribution of the shell side fluid.

According to a third feature of the present invention, there is provided the above-feature multi-tube type heat transfer apparatus, wherein heat transfer tubes provided with fins extend through the respective ones of the plurality of holes in the baffle plates.

According to a fourth feature of the present invention, there is provided the last-featured multi-tube type heat transfer apparatus, wherein the fins of the heat transfer tubes are held in contact with the inner circumferential wall of the holes in the baffle plates to support the heat transfer tubes.

According to a fifth feature of the present invention, there is provided the above-featured multi-tube type heat transfer apparatus, which apparatus further comprises a cylindrical body having its opposite ends closed, and disposed at the center of the shell in parallel to the heat transfer tubes.

According to the first feature of the present invention, owing to the fact that the shell side fluid flows through the annular passageways formed by the holes in the baffle plates and the heat transfer tubes, the cross-sectional areas of the same flow passageways can be chosen at an appropriate magnitude, thereby the pressure loss is reduced, and the heat transfer performance can be enhanced.

According to the above-described second feature of the present invention, in addition to the above-mentioned first feature, owing to the fact that the cross-sectional areas of the flow passageways are distributed and made different, flow of the shell side fluid in the radial directions along the baffle plates of the heat transfer apparatus is produced. Thereby it becomes possible to enhance the heat transfer performance as compared to the case of parallel flow. The flow rate in the radial directions can be set at an appropriate value by appropriately selecting the distribution of the hole diameters. Accordingly, the flow rate ratio of the flow in the radial direction of the heat transfer apparatus to the flow in the axial direction perpendicular to the baffle plates can be arbitrarily set, and heat transfer performance can be enhanced within an allowable limit of the pressure loss.

Furthermore, in the case where fluid is introduced into or led out from the shell of the heat transfer apparatus, for instance, through an annular dispersing tube, in the second featured, structure by enlarging the flow passageway cross-sectional areas at the center portion of the baffle plate located in the introducing section or in the lead-out section and reducing the flow passageway cross-section areas at the peripheral portion, the shell side fluid is made to flow in the radial directions in the heat transfer tube group in the introducing section or in the lead-out section. Thereby a pressure loss is produced at the central portion is compensated, and the flow rate distribution of the flow in the axial direction can be made uniform.

According to the above-described third feature of the present invention, since the shell side fluid flows through the annular passageways formed by the holes in the baffle plates and the heat transfer tubes, the cross-sectional areas of the same annular passageways can be made to have an appropriate magnitude, and thereby the pressure loss of the shell side fluid is reduced and heat transfer performance is enhanced, and furthermore, owing to the fins provided on the heat transfer tubes, higher and uniform heat transfer performance can be obtained.

Moreover, according to the above-described fourth feature of the present invention, in addition to the aforementioned features, owing to the fact that the fins are held in contact with the inner walls of the holes in the baffle plates and the heat transfer tubes are supported via the fins, any other special supporting device for the heat transfer tubes is unnecessary.

In addition to the advantages that the pressure loss is reduced and the heat transfer performance can be enhanced according to the aforementioned features of the present invention, according to the fifth feature of the present invention, owing to the fact that the heat transfer apparatus further comprises a cylindrical body having its opposite ends closed, and disposed at the center of the shell in parallel to the heat transfer tubes, the following advantages are obtained:

(1) Since heat transfer tubes acting as heat sources are not present in the central portion, enlargement of the temperature difference at the center can be prevented.

(2) Among the multi-tube type heat transfer apparatus having circular/annular shaped baffle plates as described above and shown in FIG. 16, also there is known an apparatus of the type that heat transfer tubes in the central portion are removed. However, in this type of known apparatus, in order to prevent a bypass flow of heat medium caused by removal of the heat transfer tubes in the central portion, a flow passageway is not provided in the central portion of the circular-shaped baffle plate, but a fluid patch is provided. Accordingly, in the apparatus of this type, a stagnating region of the shell side fluid is produced under the above-mentioned circular-shaped baffle plate, and in the proximity of this region, heat transfer deteriorates. Whereas according to the fifth feature of the present invention, since a cylindrical body having its upper and lower ends closed is disposed in the central portion, a flow passageway having a large resistance can be insured, and simultaneously with the prevention of bypass flow of the shell side fluid, stagnation is also prevented.

(3) Still further, since a relatively large amount of heat medium can be made to enter to the center of the shell of the reactor apparatus if the cylindrical body is disposed apart from the header plate on the heat medium inlet side, a temperature difference between the central portion and the inlet can be made small.

The above-mentioned and other objects, features and advantages of the present invention will become more apparent by reference to the following description of preferred embodiments of the invention taken in conjunction with the accompanying drawings.

BRIEF DESCRIPTION OF THE DRAWINGS

In the accompanying drawings:

FIG. 10 is a longitudinal cross-sectional view of a multi-tube type heat transfer apparatus according to a fifth preferred embodiment of the present invention;

FIG. 12(A)–(C) are schematic view showing cross-sectional area distribution of shell side fluid passageways in a baffle plate used in the same preferred embodiment;

FIG. 12(A) and 12(B) are diagrams showing temperature distribution along the radial direction in the heat transfer apparatus according to the fifth preferred embodiment and according to the application shown in FIG. 5, respectively;

FIG. 17 shows rod baffles in the prior art, FIG. 17(A) being an elevation view of the same, FIG. 17(B) being a schematic perspective view of the same, and FIG. 17(C) being a schematic view of a reactor tube and rods.

DESCRIPTION OF THE PREFERRED EMBODIMENTS

Now a first preferred embodiment of the present invention will be described with reference to FIGS. 1 and 2.

Figure 14:
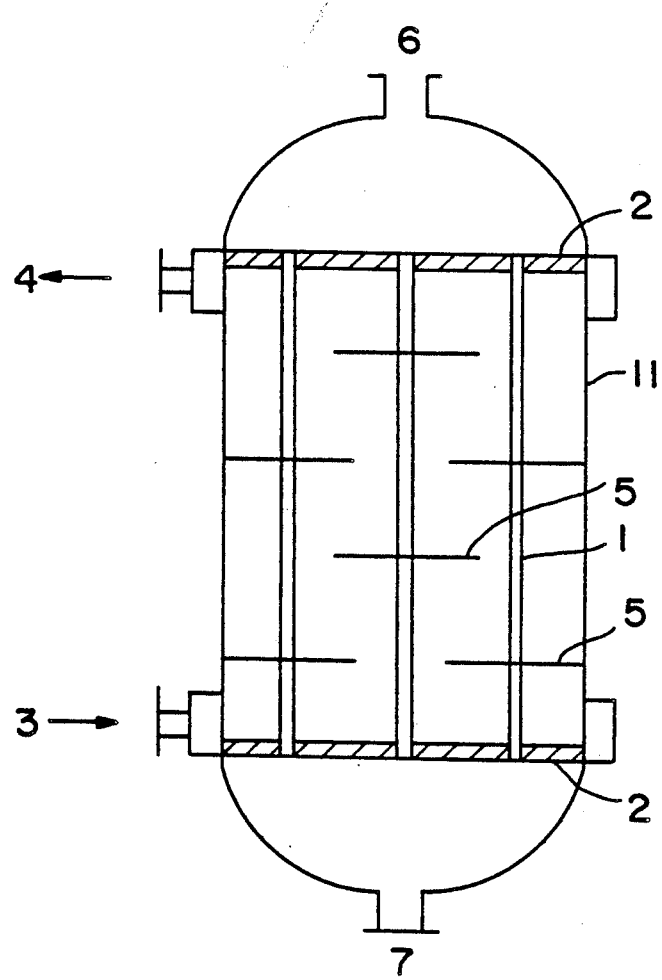
FIG. 14 is a schematic view showing a multi-tube type catalytic reactor apparatus in the prior art.
Figure 15A:
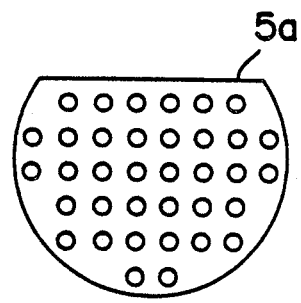
FIGS. 15(A) and 15(B) are schematic views showing partly broken circular baffle plates in the prior art.
Figure 15B:
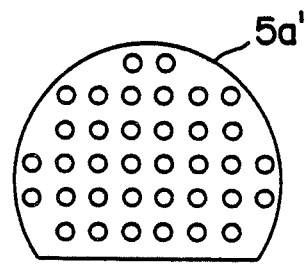
Figure 16A:
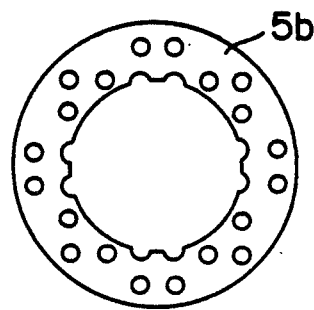
FIGS. 16(A) and 16(B) are schematic views showing circular-annular-shaped baffle plates in the prior art.
Figure 16B:
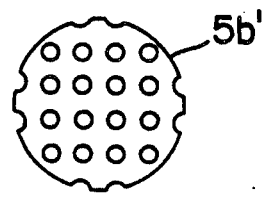

This preferred embodiment is applicable to a reactor of the type shown in FIG. 14, and improvements have been made in the portions described in the following. In FIGS. 1 and 2, component parts identical to those shown in FIG. 14 are given like reference numerals, and further description thereof will be omitted.

Figure 2:
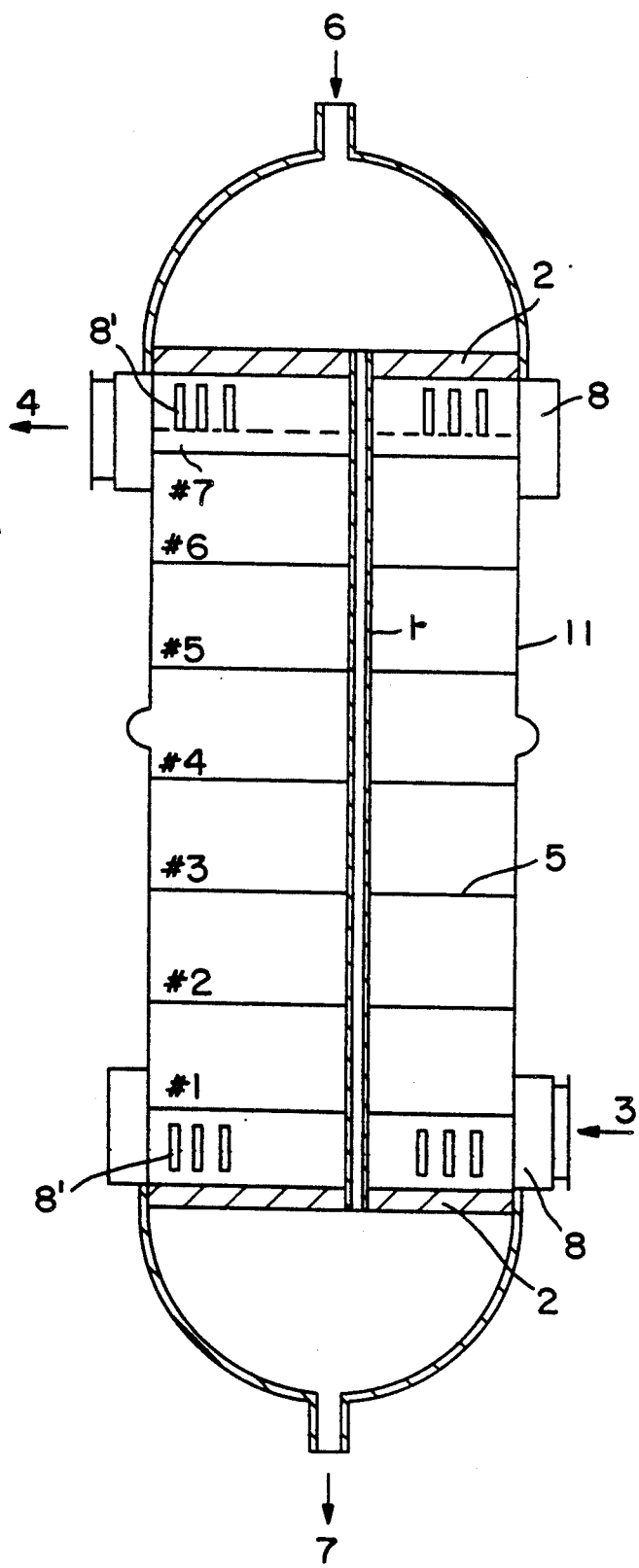
FIG. 2 is a longitudinal cross-sectional view of a reactor apparatus according to the same preferred embodiment.

In this preferred embodiment, seven baffle plates of #1–#7 are provided at intervals in the direction of flow of the shell side fluid from below to above within a reactor shell 11 as shown in FIG. 2, and the outer circumferences of the respective baffle plates are fixedly secured to the whole inner circumference of the outer wall of the reactor shell 11. In addition, to the inlet nozzle 3 and the outlet nozzle 4 of the shell side fluid are respectively connected annular dispersing tubes 8 having a plurality of slit holes 8' surrounding the reactor shell 11.

Figure 1A:
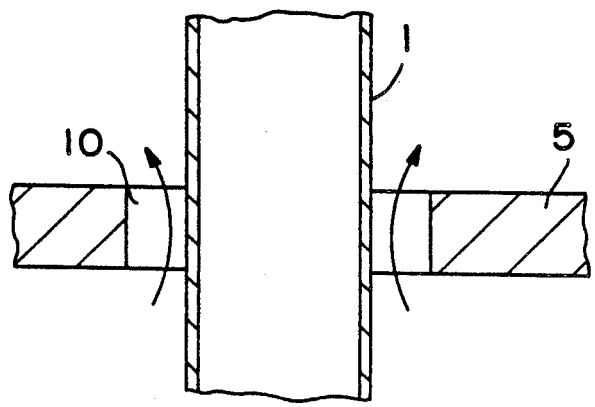
FIG. 1(A) is a longitudinal cross-sectional view of a part of a baffle plate and a heat transfer tube according to a first preferred embodiment of the present invention.
Figure 1B:
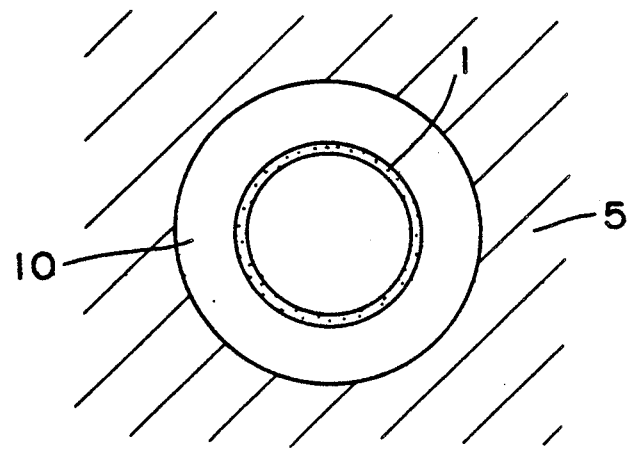
FIG. 1(B) is a transverse cross-sectional view of the same.

In the respective baffle plates are formed a plurality of holes having sufficiently larger diameters than outer diameters of heat transfer tubes 1 as shown in FIG. 1. The heat transfer tubes 1 extend through the respective holes, and annular space portions formed between the inner circumferences of these holes and the outer circumferences of the heat transfer tubes 1 are used as flow passageways 10 of the shell side fluid. It is to be noted that arrows in this figure indicate directions of flow of the shell side fluid.

In the illustrated embodiment, since an annular flow passageway having a sufficiently large cross-sectional area is formed between the hole and the heat transfer tube 1, pressure loss of the shell side fluid can be reduced. In addition, since pressure loss of the fluid is reduced, a flow velocity of the shell side fluid is insured and heat transfer performance can be enhanced.

Next, a second preferred embodiment of the present invention will be described with reference to FIG. 3.

In a heat transfer apparatus which is especially required to prevent degradation of the heat transfer performance caused by the fact that within a reactor shell, the shell side fluid forms a perfect parallel flow in the axial direction perpendicular to the baffle plates, it is necessary to generate appropriate radial flows along the baffle plates.

This preferred embodiment has been designed for that purpose, and as will be described in the following, the above-described first preferred embodiment has been modified in such manner that the cross-sectional areas of the annular flow passageways in the respective baffle plates are distributed to produce radial flows.

Figure 3A:
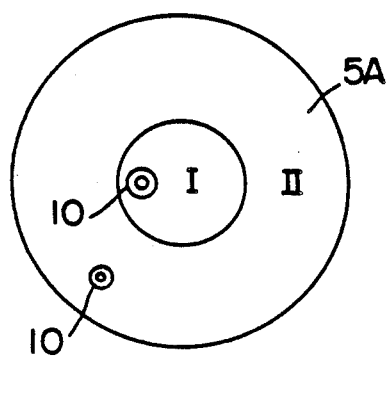
FIGS. 3(A) and 3(B) are schematic views showing the cross-sectional area distribution of shell side fluid passageways in baffle plates according to a second preferred embodiment of the present invention.
Figure 3B:
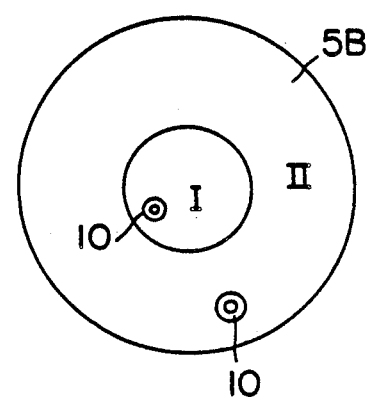

More particularly, as shown in FIG. 3, in a first baffle plate 5A, the hole diameters in a region I at the central portion of the baffle plate 5A are chosen large so that cross-sectional areas of annular flow passageways 10 around the heat transfer tubes disposed in the region I at the central portion delimited by a circumference may become large, but the hole diameters in a region II at the peripheral portion of the baffle plate 5A are chosen small so that cross-sectional areas of annular flow passageways 10 around the heat transfer tubes disposed in the region II at the ring-shaped peripheral portion may become small. On the contrary, in a second baffle plate 5B, the hole diameters in the region I at the central portion are chosen small so that cross-sectional areas of annular flow passageways 10 around the heat transfer tubes disposed in the region I at the central portion may become small, but the hole diameters in the region II at the peripheral portion are chosen large so that cross-section areas of annular flow passageways 10 around the heat transfer tubes disposed in the region II at the peripheral portion may become large.

By disposing the first and second baffle plates 5A and 5B having such structures alternately along the direction of flow, radial flows (flows along the baffle plates 5A and 5B) corresponding to the difference of the flow passageway cross-sectional areas are produced. Owing to these radial flows, it becomes possible to maintain heat transfer performance high as compared to the value for perfectly parallel flows.

In this preferred embodiment, as described above, by varying the hole diameters of the baffle plates, cross-sectional areas of flow passageways can be arbitrarily set, and a flow rate ratio of radial flow to axial flow can be arbitrarily set. It thereby becomes possible to optimize the heat transfer performance of an apparatus while abiding an allowable value of pressure loss. In addition, in the case where this preferred embodiment is applied to a multi-tube type reactor apparatus, even if any thermal deviation should occur in the process within the reactor tubes, owing to this radial flow, the temperature of the heat medium consisting of the shell side fluid covering the reactor tubes can be prevented from abruptly rising. Thereby the reactions within the respective reactor tubes can be uniformly effected and further, degrees of deterioration of catalyst within the catalytic reactors also can be maintained uniform.

It is to be noted that while the distribution of areas of the holes formed in the first and second baffle plates 5A and 5B, respectively, have concentric circular arrays, and two kinds of hole diameters are provided in the above-described second preferred embodiment, with regard to the hole diameter distribution of the holes, as a matter of course, it can be determined in a most appropriate manner depending upon the structures and objects of the respective instruments.

Figure 4:
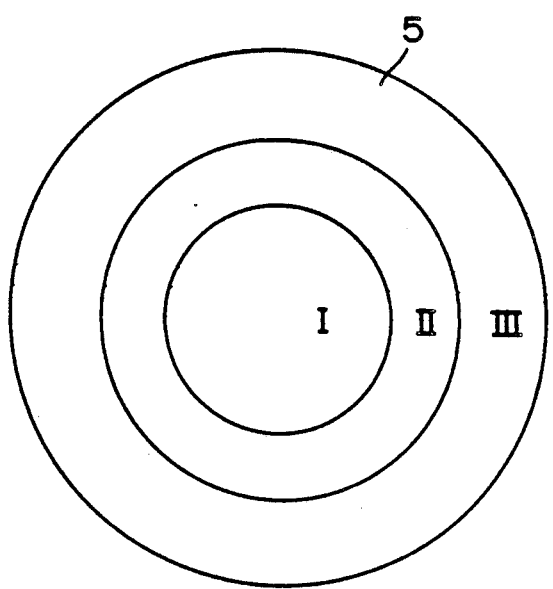
FIG. 4 is a schematic view showing cross-sectional area distribution of shell side fluid passageways in baffle plates according to a third preferred embodiment of the present invention.

A third preferred embodiment of the present invention will be described with reference to FIG. 4.

In the above-described first and second preferred embodiments, in order to make the flow and heat transfer performance effective, it is favorable to make the flow rate distributions at the inlet portion and the outlet portion of the shell side fluid uniform along the radial direction of the reactor shell. For instance, in the case where the shell side fluid is introduced into or led out of the shell through an annular dispersing tube 8 having slit holes surrounding the reactor shell as shown in FIG. 2, this preferred embodiment is employed.

More particularly, in this preferred embodiment, the baffle plate 5 in the introducing section indicated by #1 in FIG. 2 and the baffle plate 5 in the lead-out section indicated by #7 are formed with the following structure. That is, as shown in FIG. 4, the baffle plates 5 are divided by concentric circles into a central portion of a shell (region I), a peripheral portion (region III) and an intermediate portion (region II) therebetween, the cross-sectional areas of the annular flow passageways around the respective heat transfer tubes in the central portion (region I) are made large, and the cross-section areas of the annular flow passageways are successively reduced in the intermediate portion (region II) and in the peripheral portion (region III).

In this preferred embodiment, in order that in the inlet portion and the outlet portion of the shell, a flow rate in the axial direction of the shell in the central portion (region I) may not decrease due to pressure loss generated by the shell side fluid flowing across the heat transfer tube group in the radial direction, flow passageway cross-sectional areas in the central portion (region I) are enlarged, and the flow passageway cross-section areas are successively reduced towards the outside of the reactor shell, thereby pressure loss caused by radial flow can be compensated, and distribution of flow rates in the axial direction of the reactor shell can be made uniform. It is to be noted that in this preferred embodiment, the flow passageway cross-sectional areas in the baffle plates other than the #1 baffle plate in the introducing portion and the #7 baffle plate in the lead-out portion, could be appropriately varied along the radial direction.

Now one example of the application of the just-described embodiment of the present invention as applied to a multi-tube type catalytic reactor apparatus will be explained.

This example of an application employs a reactor apparatus as shown in FIG. 2. Process fluid is introduced through an inlet nozzle 6 into a reactor apparatus, then it performs a predetermined reaction within 11,000 catalyst-packed reactor tubes 1 each having an outer diameter of 26 mm and a tube length of 12,000 mm, and the reaction heat generated at that time is effectively recovered by the heat medium forming shell side fluid which is flowing outside of the tubes. The process fluid after the reaction is discharged through an outlet nozzle 7. On the other hand, heat a medium consisting of nitrate group molten salt flowing at a flow rate of 10,000 m$^3$/h flows from an inlet nozzle 3 through an annular dispersing tube having slit holes and is introduced from an outer circumferential portion of a reactor shell 11 having an inner diameter of 3,700 mm into the reactor shell.

Figure 5C:
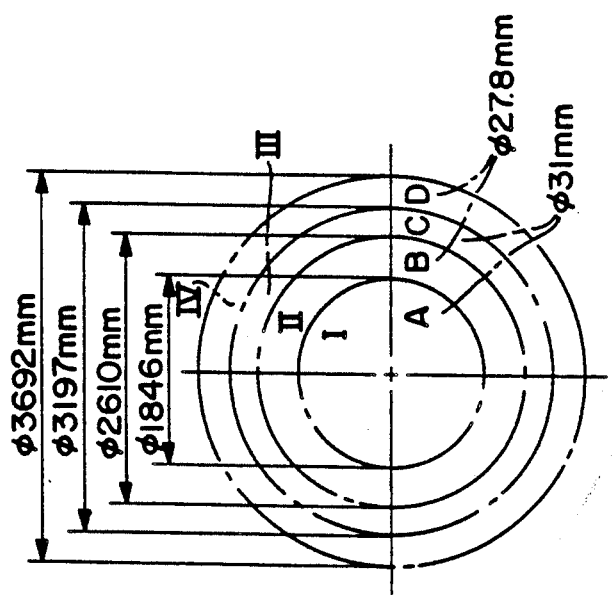
FIGS. 5(A), 5(B) and 5(C) are schematic views showing cross-sectional area distribution of shell side fluid passageways in baffle plates of a reactor which is one application of the present invention.
Figure 5B:
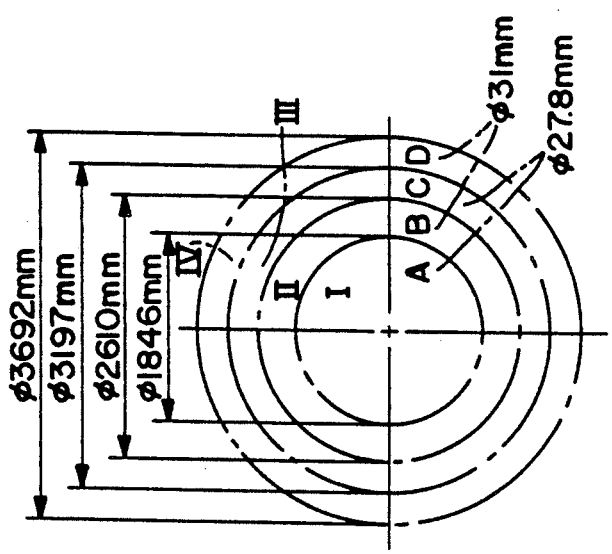
Figure 5A:
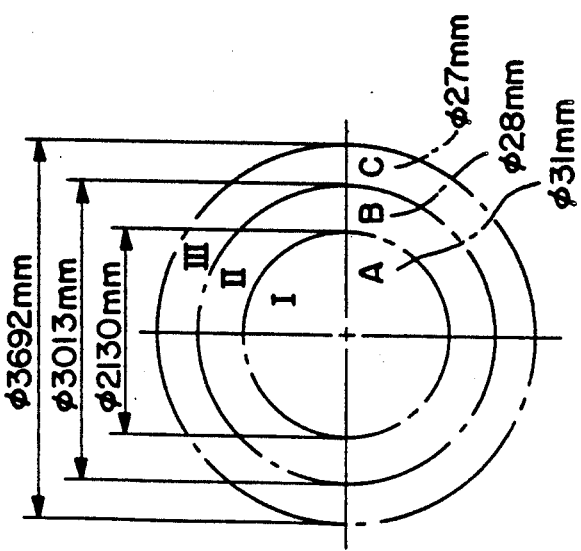

As the baffle plate #1 at the lowermost level (See FIG. 2), a baffle plate consisting of a central portion (region I), an intermediate portion (region II) and a peripheral portion (region III) according to the above-described third preferred embodiment is employed. The dimensions of the above-described respective portions are as shown in FIG. 5(A). The dimensions of the diameters of the holes in the respective portions of the baffle plate are 31 mm, 28 mm and 27 mm as indicated at A, B and C, respectively, in the same figure. The diameters of the holes are set at successively reduced values from the central portion via the intermediate portion up to the peripheral portion, and accordingly the cross-sectional areas of the annular flow passageways are also successively reduced.

Hence the heat medium introduced into the reactor shell is, at first, rectified into axial flow that is nearly uniform in the radial direction by the same baffle plate #1.

Subsequently, the heat medium flows from below to above within the reactor shell, and moves towards the baffle plate #2 shown in FIG. 5(B). This baffle plate #2 is a baffle plate constructed according to the aforementioned second preferred embodiment, that is, in the region I and the region III in the same figure, holes having small diameters for making the flow passageway cross-sectional areas small are provided, whereas in the region II and the region IV, holes having large diameters for making flow passageway cross-section areas large are provided. The dimensions of the respective regions I–IV and the hole diameters A–D in these regions are respectively as indicated in FIG. 5(B). On the basis of the differences in the above-described flow passageway cross-sectional areas, radial flow would be produced in the heat medium. On the other hand, the heat medium having passed through the baffle plate #2 moves towards the baffle plate #3 shown in FIG. 5(C). This baffle plate #3 is also a baffle plate according to the above-described second preferred embodiment, and as shown in the same figure, in the region I and the region III, holes having large diameters for making flow passageway cross-sectional areas large are provided, whereas in the region II and the region IV, holes having small diameters for making the flow passageway cross-sectional areas small are provided. The dimensions of the respective regions and the hole diameters A–D are as indicated in the same figure. Radial flow based on the differences in the flow passageway cross-sections is produced, and this radial flow is directed in the opposite direction to the radial flow produced by the baffle plate #2. Subsequently, similar flow patterns are alternately repeated until the baffle plate #6, and the heat medium recovers the reaction heat released from the reactor tubes.

The heat medium having passed through the baffle plate #6 has its flow in the axial direction of the reactor shell made uniform along the radial direction by passing through the baffle plate #7 at the uppermost level, having a similar structure to the above-described baffle plate #1. Thereafter it passes through an annular dispersing tube having similar slit holes to that on the side of the inlet nozzle 3, and is led out through an outlet nozzle 4 to the outside of the reactor apparatus.

As described above, in this example of the application, by appropriately setting the radial flows of the heat medium, it has become possible to suppress the pressure loss to a low level and to have high heat transfer performance that is uniform along the radial direction as well as along the axial direction. At the same time, these radial flows make it possible to maintain process conditions in the respective reactor tubes uniform. More particularly, there is an advantage that even if a distribution should arise in the process temperatures within the reactor tubes, the distribution of the process temperatures would not be enlarged because the temperature of the fluid on the side of the shell would become uniform. This brings about an advantage for a catalyst-packed reactor apparatus in that the degree of deterioration of the catalyst is made uniform.

Figure 6:
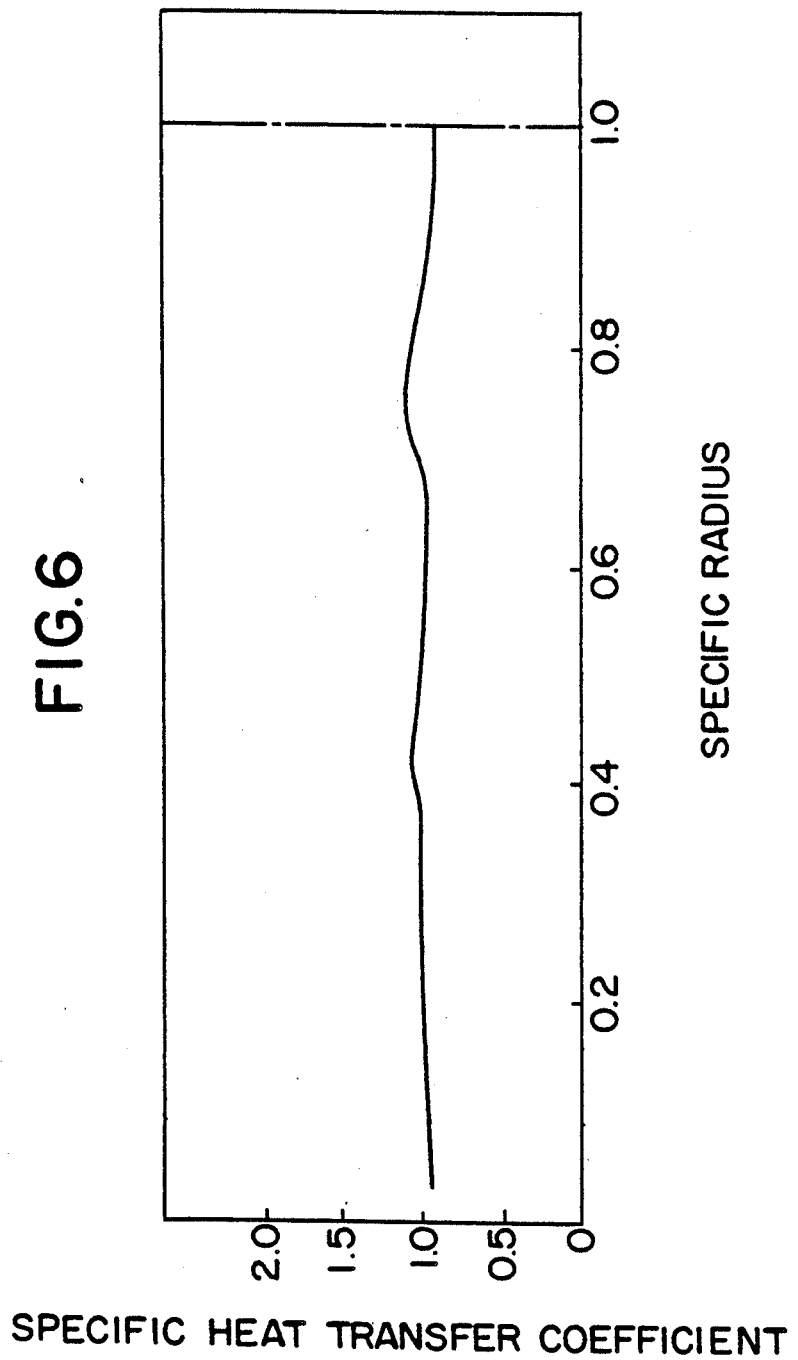
FIG. 6 is a diagram showing the variation of a specific heat transfer coefficient along the radial direction of a reactor shell in the same application of the present invention.
Figure 7:
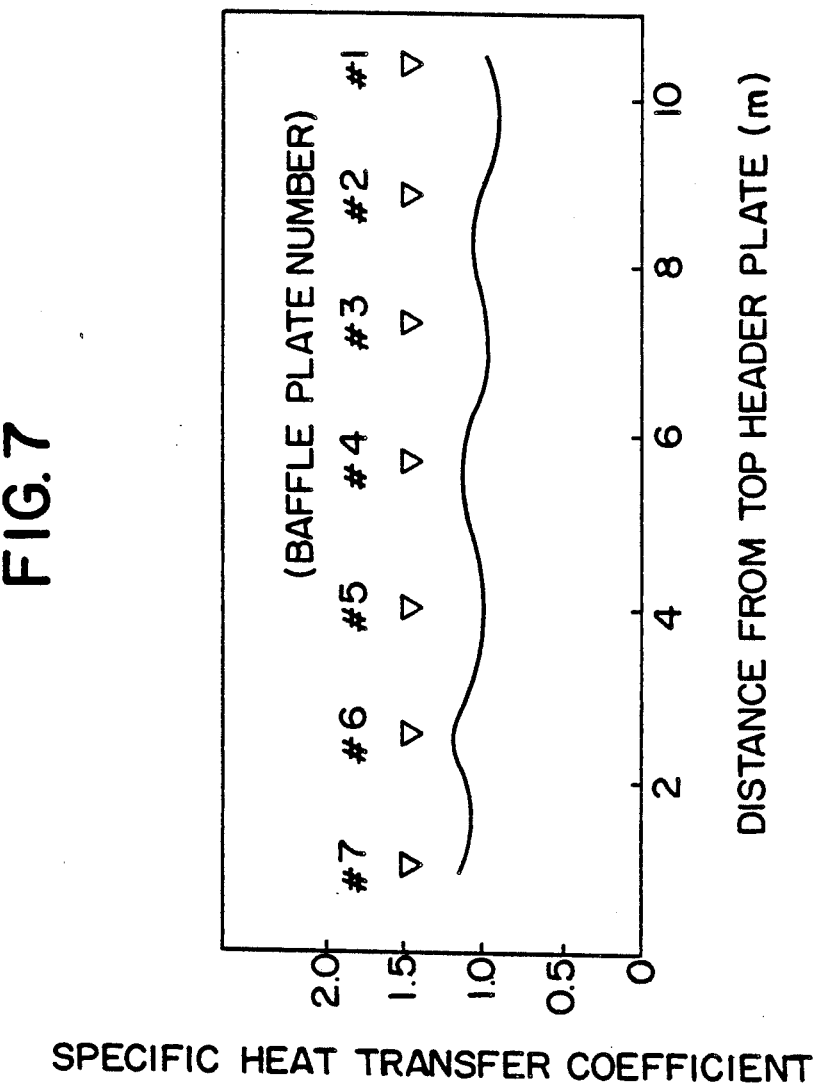
FIG. 7 is a diagram showing the variation of a specific heat transfer coefficient along the axial direction of the reactor shell in the same application of the present invention.

Heat transfer performances of the shell side fluid in the radial direction and axial direction of the reactor shell in the above-described example of the application are shown in FIGS. 6 and 7, respectively. As will be seen from these figures, in the present example of the application, flow and heat transfer performance has been attained in the radial direction as well as in the axial direction.

Now a fourth preferred embodiment of the present invention will be described with reference to FIGS. 8 and 9.

This preferred embodiment is an embodiment applied to a reactor of the type shown in FIG. 14, in which improvements have been made in the following described portions. In FIGS. 8 and 9, component parts equivalent to those in the reactor shown in FIG. 14 are given like reference numerals, and further explanation thereof will be omitted.

Figure 9:
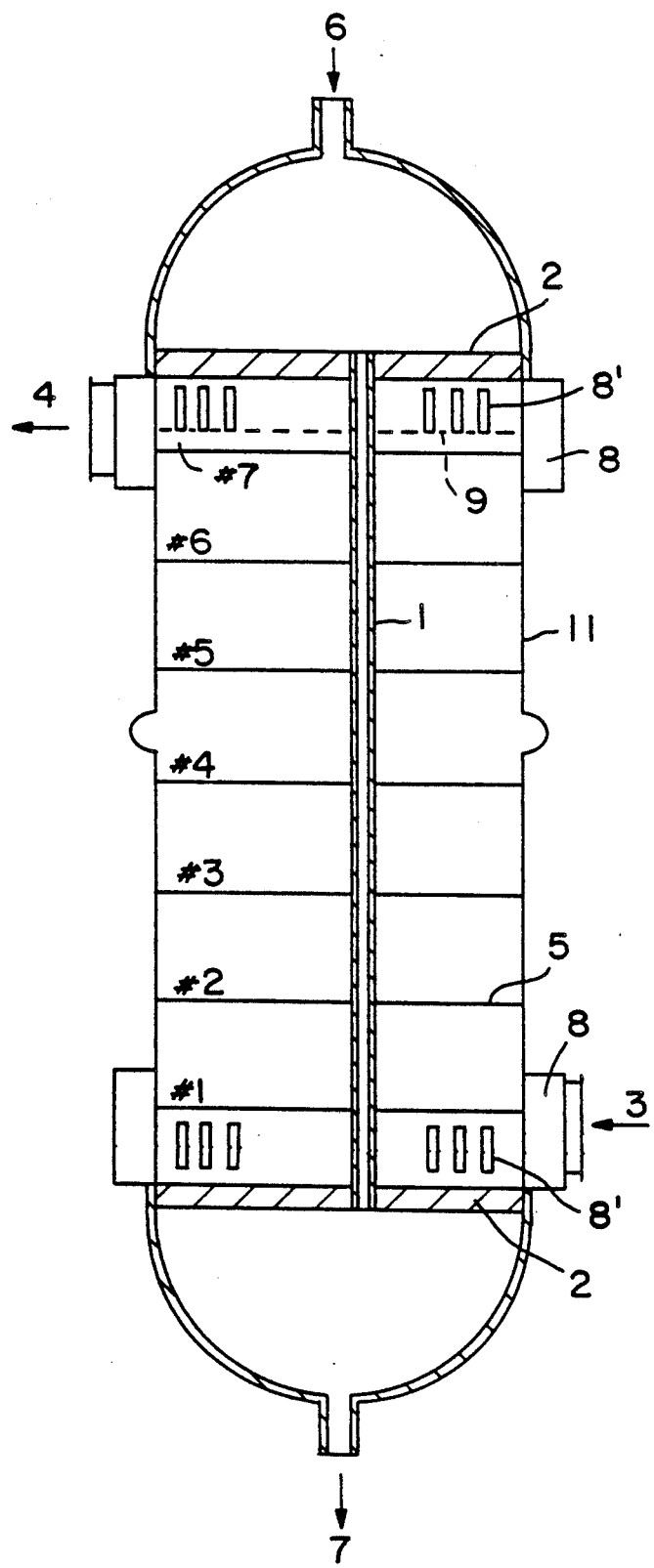
FIG. 9 is a longitudinal cross-sectional view of a reactor apparatus according to the same preferred embodiment.

In this preferred embodiment, as shown in FIG. 9, a reactor shell 11 is provided with seven baffle plates 5 of #1–#7 at intervals in the direction of the shell side fluid from below to the above, and outer circumferences of the respective baffle plates are fixedly secured to the whole inner circumferential surfaces of the outer wall of the reactor shell 11. In addition, to the inlet nozzle 3 and the outlet nozzle 4 of the shell side fluid are respectively connected annular dispersing pipes 8 each having a plurality of slit holes 8' surrounding the reactor shell 11.

Figure 8A:
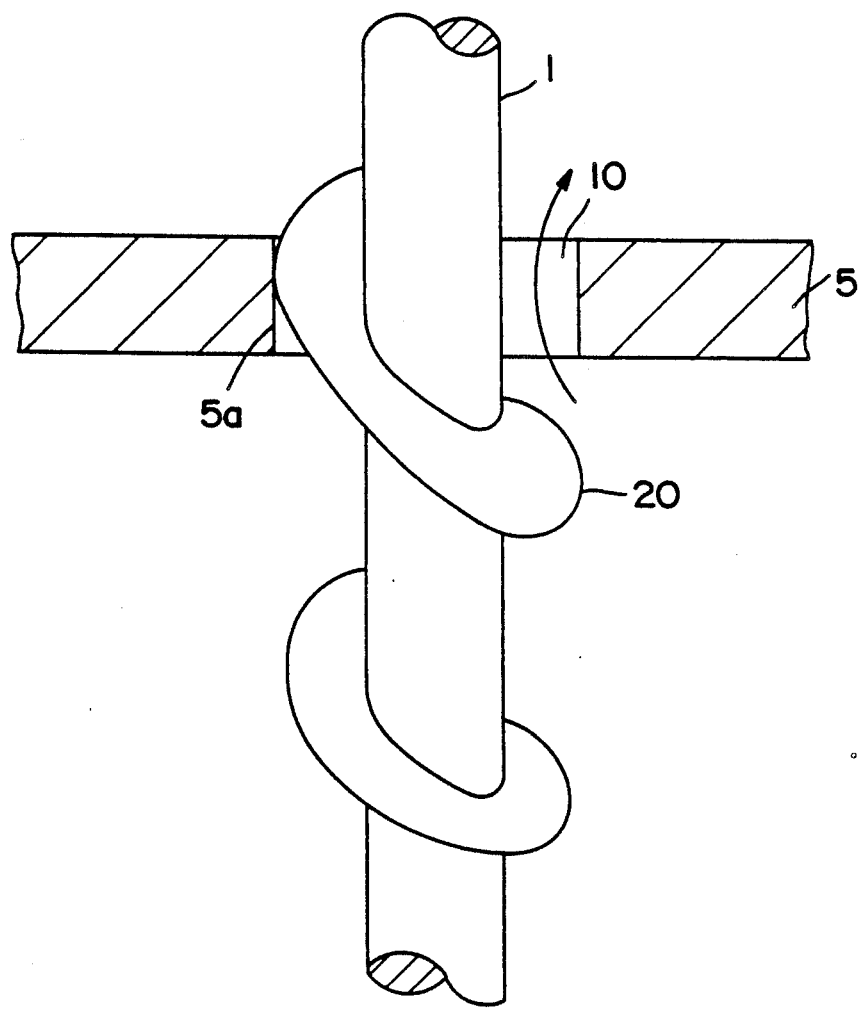
FIGS. 8(A) and 8(B) shows a part of a baffle plate and a heat transfer tube according to the fourth preferred embodiment of the present invention, FIG. 8(A) being a longitudinal cross-sectional view of the same, and FIG. 8(B) being a transverse cross-sectional view of the same.
Figure 8B:
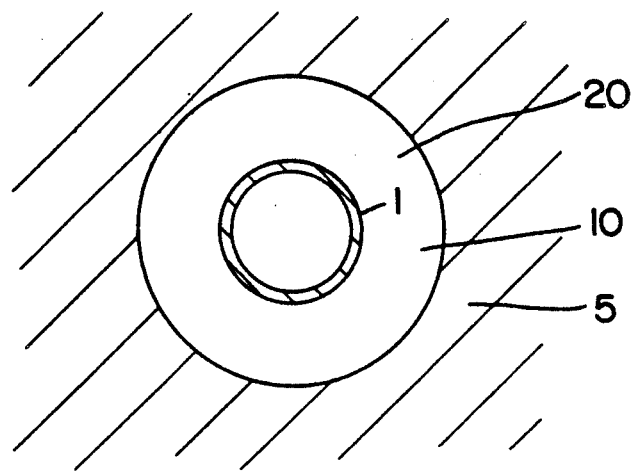

As shown in FIG. 8, in the respective baffle plates 5 are formed a plurality of holes having sufficiently larger diameters than the diameters of the heat transfer tubes (reactor tubes) 1, and the annular space portions formed between the inner circumferences of these holes and the outer circumferences of the heat transfer tubes 1 are used as flow passageways 10 of the shell side fluid. In addition, two fins 20 surrounding the heat transfer tube 1 obliquely to the axial direction of the heat transfer tube 1, that is, in a spiral manner are mounted to the outer circumference of the same heat transfer tube 1. The outer diameters of these fins 20 are chosen equal to the inner diameter of the hole in the baffle plate 5, and one of the fins 20 is adapted to support the heat transfer tube 1, holding it contact with the inner wall surface 5a of the hole. It is to be noted that reference numeral 9 designates rectifier plates, and an arrow in FIG. 8(A) indicates the direction of flow of the shell side fluid.

In this preferred embodiment, process fluid is introduced through an inlet nozzle 6 into the reactor and performs a predetermined reaction within the heat transfer tubes 1 packed with catalyst. Then reaction heat generated at that time is recovered by the heat medium which is flowing along the outside of the heat transfer tubes 1 with an extremely high heat transfer coefficient, owing to a fin effect, and the process fluid after reaction is discharged through an outlet nozzle 7.

On the other hand, a heat medium consisting of nitrate group molten salt enters from an inlet nozzle 3, then passes through an annular dispersing tube 8 having slit holes, and is introduced from the outer circumferential portion of the reactor shell into the same reactor shell, and it flows from below to above through the annular flow passageways 10 formed by the holes in the baffle plates 5, serving also as tube supporting plates and the heat transfer tubes 1 having the fins 20 serving also as a supporting device.

In this preferred embodiment, owing to the employment of the above-described construction, the cross-section areas of the annular flow passageways 10 can be set at an appropriate dimension, and thereby pressure loss of the shell side fluid can be reduced.

In addition, the shell side fluid can flow within the shell nearly in parallel to the heat transfer tubes, hence pressure loss generated by radial flow is not present, and also by the effects of the fins 20 it is possible to maintain a high heat transfer performance that is uniform along the radial direction and along the axial direction.

Furthermore, since the heat transfer tube 1 is supported with the fin 20 held in contact with the inner wall surface 5a of the hole in the baffle plate 5, a special supporting device for the heat transfer tube 1 is not necessitated.

It is to be noted that while the heat transfer tube 1 is provided with fins 20 which surround the heat transfer tube in a spiral manner in the above-described fourth preferred embodiment, the fins should not be limited to such a type, but any other type of fins can be employed as long as they allow the shell side fluid to flow through the annular flow passageway 10.

Next, a fifth preferred embodiment of the present invention will be described with reference to FIGS. 10 to 12.

As shown in FIG. 10, process fluid is introduced into a reactor shell 11 through an inlet nozzle 6 at the top and performs a predetermined reaction within a group of catalyst-packed heat transfer tubes (reactor tubes 1) consisting of about 11,000 tubes having an outer diameter of 26 mm and a tube length of 12,000 mm and disposed in parallel to one another, and reaction heat generated at that time is effectively recovered by a heat medium consisting of the shell side fluid flowing outside of the tubes. The process fluid after the reaction is discharged through an outlet nozzle 7 at the bottom. On the other hand, the shell side fluid (heat medium) consisting of nitrate group molten salt flowing at a rate of 10,000 m³/h flows from an inlet nozzle 3 provided at the lower portion of the reactor shell 11 through an annular dispersing tube 8 having slit holes 8', and is introduced into the reactor shell 11 having an inner diameter of 3,700 mm from its outer circumferential portion.

In the central portion of the reactor shell 11 are disposed a plurality of dummy tubes 9 having the same outer diameter as the heat transfer tubes 1 and arrayed in parallel to the heat transfer tubes 1. These dummy tubes 9 are not fixed to the upper nor lower header plate 2. Their upper and lower ends are located a certain distance apart from the header plates 2, their upper ends are located between the baffle plates 5 of #6 and #7, their lower ends are located between the baffle plates 5 of #1 and #2, and they are supported by the baffle plates 5 of #2 to #6. At both the lower and upper ends of the dummy tubes 9 are respectively provided blind plates 12 and 12'.

As the lowermost level baffle plate #1 (See FIG. 11), a baffle plate consisting of a central portion (region I), an intermediate portion (region II) and a peripheral portion (region III) is employed, and at the center of the central portion (region I) is formed a hole of 300 mm in diameter.

Figure 11A:
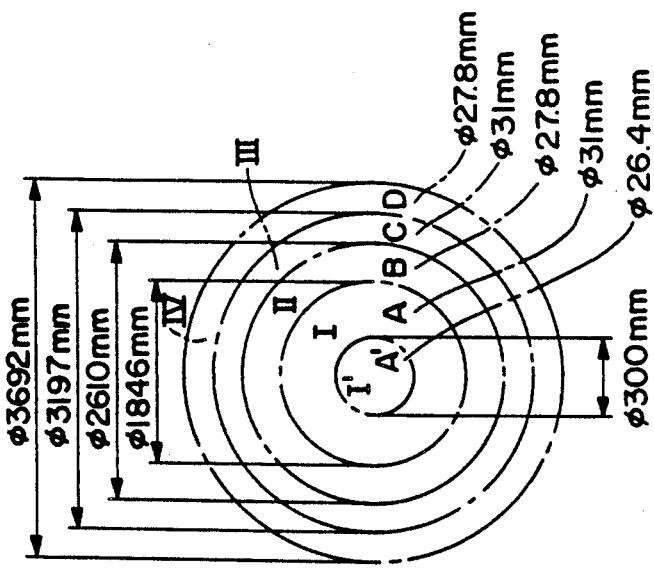

The dimensions of the respective portions are as indicated in FIG. 11(A). The dimensions of the diameters of the holes in the respective regions of the baffle plate through which the heat transfer tubes 1 extend are 31 mm, 28 mm and 27 mm, respectively, as shown at A, B and C in the same figure. The diameters of the holes are chosen successively smaller from the central portion, through the intermediate portion up to the peripheral portion, and accordingly, the cross-sectional areas of the annular flow passageways formed between the holes of the baffle plates and the heat transfer tubes 1 are also reduced successively. In addition, above the portion of the above-described hole of 300 mm in diameter at the center of the central portion (region I) are disposed a plurality of dummy tubes 9 as described above, at the same pitch as the other heat transfer tubes 1.

In this preferred embodiment, by selecting the cross-sectional areas of flow passageways in the central portion (region I) large and successively reducing the cross-sectional areas of flow passageways as the location shifts to the intermediate portion (region II) and then to the peripheral portion (region III) so that a flow rate in the axial direction of the shell in the central portion (region I) may not be reduced due to pressure loss caused by the fact that at the inlet and outlet portions of the shell the shell side fluid flows in the radial direction across the heat transfer tube group, the pressure loss caused by the radial flow can be compensated, and flow rate distribution along the axial direction in the reactor shell can be made nearly uniform.

Moreover, in this preferred embodiment, since a hole is formed at the center of the central portion (region I) of the lowermost level baffle plate #1, the amount of the shell side fluid entering into the central portion increases.

The shell side fluid which has risen through this hole is dispersed in the horizontal directions by the blind plate 12 of the dummy tubes 9 and mixed with shell side fluid which has passed through the central portion (region I) of the baffle plate #1, and then it rises further.

As described above, among the shell side fluid having flowed into the reactor shell 11, the amount of the fluid entering into the central portion becomes large, and moreover, in the central portion, since there exists a hole of 300 mm in diameter and heat transfer tubes are not present, a temperature difference in the radial direction of the reactor shell or a width of temperature rise in the inlet region can be suppressed.

In addition, since the shell side fluid after passage through the holes in the baffle plate #1 is again dispersed in the radial directions by the blind plate 12, flow rate distribution in the radial direction can be made uniform.

Figure 11B:
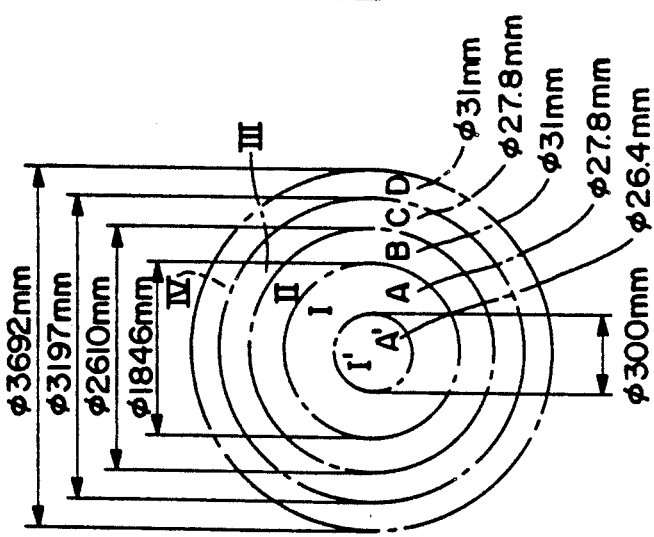

Subsequently, the shell side fluid flows from below to above within the reactor shell, and moves towards the baffle plate #2 as shown in FIG. 11(B). In this baffle plate #2, in the region I and the region III shown in this figure, holes having small diameters for reducing cross-sectional areas of the flow passageways are formed, while in the region II and region IV holes having large diameters for enlarging cross-sectional areas of flow passageways are formed. In addition, in a partial region I' of 300 mm in diameter at the center of the central portion (region I) are formed a plurality of small holes through which the above-described respective dummy tubes 9 extend.

The dimensions of the respective regions I', I–IV and the diameters A', A, B, C and D of the holes in these regions are as indicated in FIG. 11(B). On the basis of the above-described difference in the cross-sectional areas of the flow passageways, radial flow is produced in the shell side fluid.

In the dummy tube region between the baffle plates 5 of #1 and #2 in the region I', the shell side fluid flows through the interstices of the dummy tubes 9 in nearly parallel flow, and the flow rate in the axial direction is nearly equal to that in the region where the heat transfer tubes 1 packed with catalyst exist. Accordingly, as compared to the case where simply the heat transfer tubes in the central portion were removed, stagnation of the shell side fluid is reduced, and the heat transfer coefficient around the heat transfer tubes surrounding the region where the heat transfer tubes were removed also becomes large. In addition, since the dummy tubes 9 extend through the holes of $\phi 26.4$ mm in the baffle plate, though only a little, the shell side fluid can pass through the interstices between the holes in the baffle plate and the dummy tubes, and so, stagnation of the shell side fluid under the baffle plate 5 of #2 can be prevented.

Figure 11C:
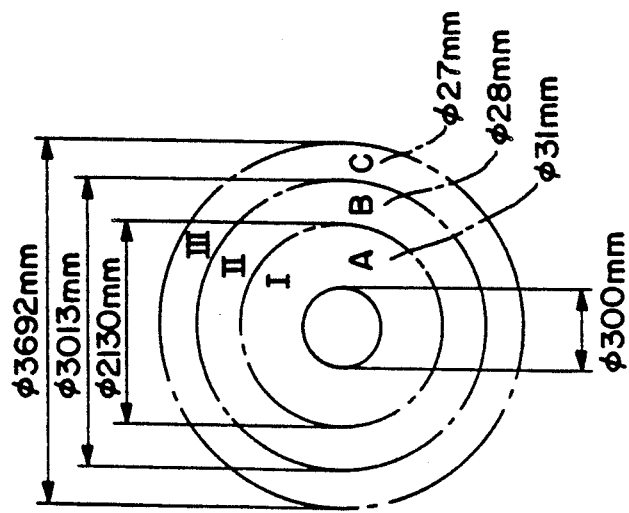

On the other hand, the shell side fluid having passed through the baffle plate 5 of #2 subsequently moves towards the baffle plate 5 of #3 shown in FIG. 11(C). As shown in this figure, in this baffle plate #3, holes having large diameters for enlarging the cross-sectional areas of flow passageways are formed in the region I and in the region III, but in the region II and in the region IV, holes having small diameters for reducing the cross-sectional areas of flow passageways are formed. The dimensions of the respective regions I-IV and the diameters A-D of the holes in the respective regions are as indicated in FIG. 11(C). Radial flow based on the difference in the cross-sectional areas of flow passageways is produced, and this radial flow is directed in the opposite direction to that of the baffle plate #2. Thereafter, similar flow patterns are repeated alternately up to the baffle plate #6, and the shell side fluid recovers the reaction heat released from the reactor tubes.

In the central portion (region I') of 300 mm in diameter in the baffle plates #3-#6 are formed a plurality of holes having hole diameters A' through which the respective dummy tubes 9 extend, and the behavior of the shell side fluid passing through the interstices of the dummy tubes 9 is almost similar to that when the fluid passes through the baffle plate #2.

The shell side fluid having passed through the baffle plate #6 will then pass through the uppermost level baffle plate #7 having a similar structure to the above-described baffle plate #1. The top ends of the dummy tube 9 are disposed apart from the upper header plate 2' and positioned under the baffle plate #7, and in the central portion of the baffle plate #7 is also formed a hole of φ300 mm. Consequently, when the shell side fluid passes through the baffle plate #6 and flows towards the baffle plate #7, a part of the fluid corresponding to the central portion (region I) flows towards the center, then passes through the gap above the upper blind plate 12' of the dummy tube 9, further passes through the center hole of the baffle plate #7 and enters into an outlet region, and then the fluid disperses in the horizontal directions.

By generating such flow, suppression of the stagnation of the shell side fluid that is liable to occur at the central portion of the upper header plate 2' and the degradation of the heat transfer coefficient of the tubes and generation of a hot spot accompanying therewith can be realized.

Subsequently, the shell side fluid passes through an annular dispersing tube 8 having slit holes 8' which is similar to that on the side of the inlet nozzle 3, and is led out from an outlet nozzle 4 to the outside of the reactor apparatus.

As described above, in this preferred embodiment, owing to the fact that dummy tubes are provided at the central portion, not fixed to the upper and lower header plates, but disposed an arbitrary distance apart from the header plates, it has become possible to suppress the temperature difference of the shell side fluid in the radial direction.

Figure 12A:
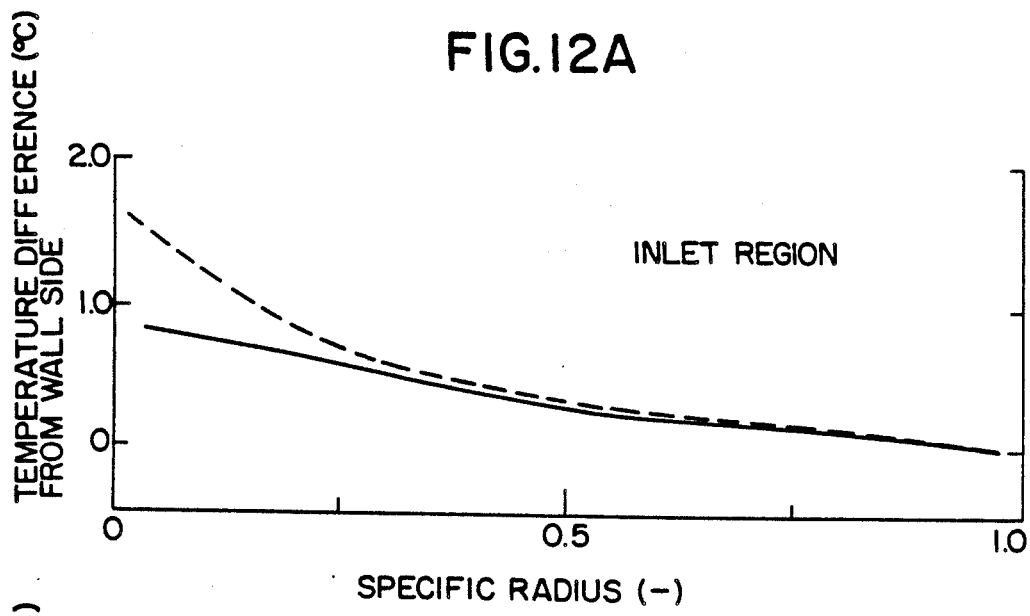
Figure 12B:
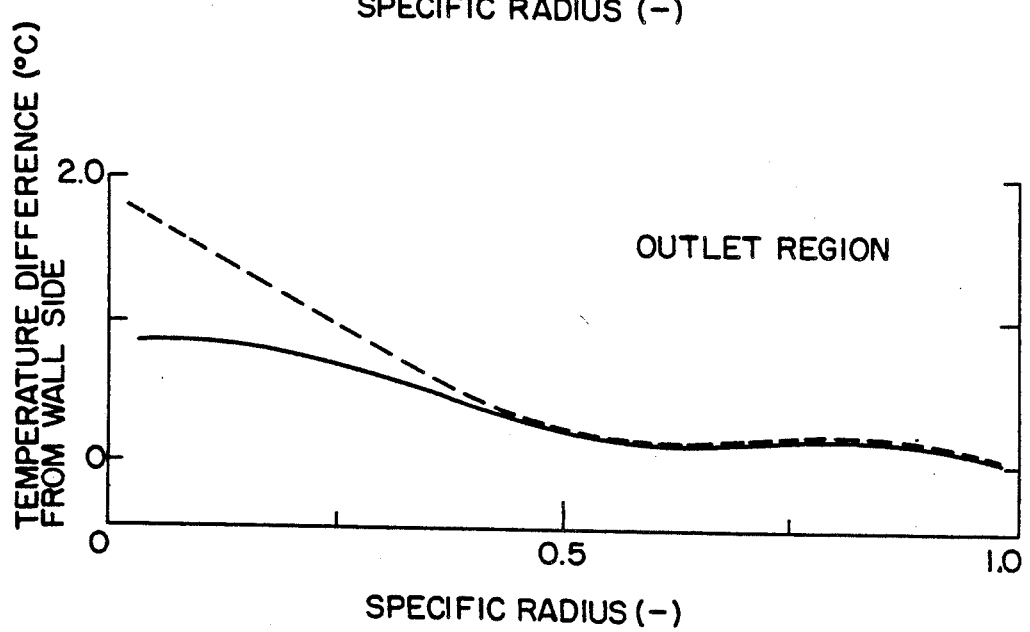

In FIG. 12 are shown temperature distributions in the radial direction (dotted lines) in the inlet region and outlet region of a multi-tube type catalytic reactor apparatus which is one example of application of the above-described second preferred embodiment shown in FIG. 5, and similar temperature distributions (solid lines) according to this preferred embodiment. As shown in FIG. 12, according to this preferred embodiment, as compared to the apparatus shown in FIG. 6, in the inlet region a temperature difference was improved from about 1.7° C. to about 0.8° C., and in the outlet region it was improved from about 1.8° C. to about 0.8° C.

Figure 13:
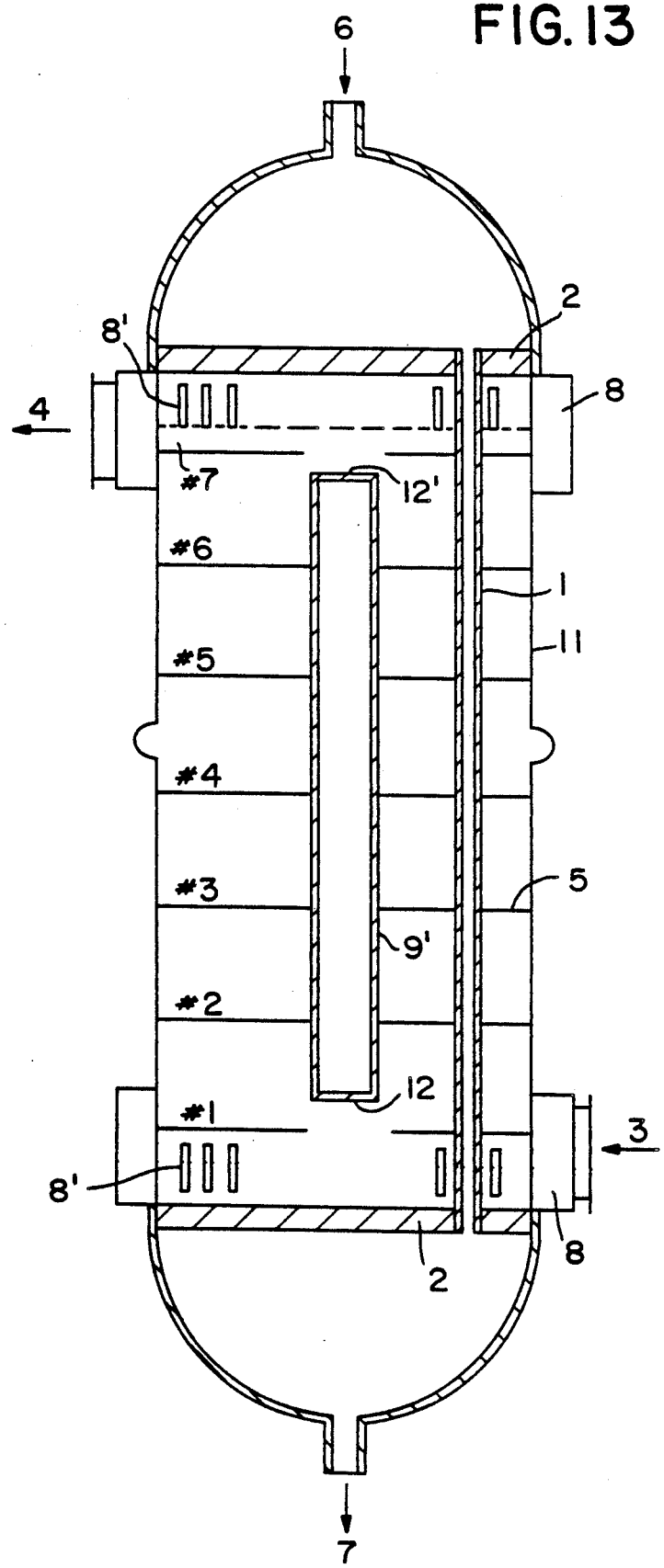
FIG. 13 is a longitudinal cross-sectional view of a multi-tube type heat transfer apparatus according to a sixth preferred embodiment of the present invention.

A sixth preferred embodiment of the present invention is illustrated in FIG. 13.

In this preferred embodiment, in place of the dummy tubes in the above-described fifth preferred embodiment, a cylinder 9' having its lower and upper ends closed by blind plates 12 and 12', respectively, is disposed. Like the fifth preferred embodiment, the cylinder 9' is supported by the baffle plates 5 of #2 to #6. The used baffle plates are almost similar to those shown in FIG. 11. However, in the region I' of the baffle plates of #2 to #6, a large number of small-diameter holes are not formed but a single hole having a large diameter is formed.

In this preferred embodiment, owing to the employment of the above-described construction, stagnation of the shell side fluid in the central portion is prevented, and temperature difference in the radial direction is suppressed. It is to be noted that temperature differences in the radial direction are almost similar to the temperature distribution shown in FIG. 12 in connection to the fifth preferred embodiment.

It is to be noted that while the dummy tubes or a cylinder is supported by the baffle plates and disposed apart from the upper and lower header plates in the above-described fifth and sixth preferred embodiment, the opposite ends of the cylindrical body could be fixed by the header plates, or modification could be made such that one end is fixed to a header plate and the other portions are supported by the baffle plates, and the other end may be positioned apart from a header plate. In addition, support of the cylindrical body could be done by a tube supporting plate fixed to the reactor shell without using the baffle plates.

As described in detail above, according to the present invention, by the simple measures that annular flow passageways of the shell side fluid are provided between holes in baffle plates and heat transfer tubes extending through the holes, pressure loss of the shell side fluid is reduced, and good heat transfer performance can be obtained.

In addition, according to the present invention, by giving appropriate cross-sectional area distributions to the annular flow passageways of the shell side fluid, a flow rate in the radial direction that is appropriate with respect to a flow rate in the axial direction is given to the flow of the shell side fluid within a heat transfer apparatus, thereby heat transfer performance can be enhanced within an allowable limit of pressure loss, and further, flow rate distribution in the axial flow can be made uniform.

Furthermore, according to the present invention, owing to the fins provided on the heat transfer tubes, high and uniform heat transfer performance can be obtained, and the heat transfer tubes can be supported by cooperation of the fins and the circumferential wall surfaces of the holes in the baffle plates, and therefore, the heat transfer tubes can be supported without necessitating any special supporting device.

Still further according to the present invention, by disposing a cylindrical body having its opposite ends closed, in the central portion of a multi-tube type heat transfer apparatus, in which annular flow passageways of the shell side fluid are provided between the holes in the baffle plates and the heat transfer tubes extend therethrough, stagnation of the shell side fluid that is liable to arise in the central portion of the apparatus can be prevented, and temperature differences in the radial direction of the shell side fluid can be suppressed. Furthermore, in the case where the end of the cylindrical body is disposed an arbitrary distance apart from a header plate, a flow rate of the shell side fluid flowing from the inlet of the shell towards the center is increased, and thereby temperature differences of the shell side fluid in the radial direction can be further effectively suppressed.

While a principle of the present invention has been described above in connection to one preferred embodiment of the invention, it is a matter of course that many apparently widely different embodiments of the present invention could be made without departing from the spirit of the present invention.

What is claimed is:

1. A multi-tube heat transfer apparatus, comprising:
   a shell having a first inlet and a first outlet for a heat transfer fluid and a second inlet and a second outlet;
   a plurality of heat transfer tubes in said shell fluidly connecting said second inlet and said second outlet; and
   a plurality of baffle plates disposed at intervals within said shell between said first inlet and said first outlet, each of said baffle plates having a plurality of holes therein, said holes having a larger inner diameter than the outside diameter of said heat transfer tubes to define annular spaces therebetween, and said heat transfer tubes extending through respective said holes of said baffle plates, wherein annular flow passageways for the heat transfer fluid are defined by said annular spaces;
   wherein said inner diameter of said holes in said baffle plates are of varying sizes distributed on said baffle plates to define said annular flow passageways with cross-sectional areas of varying sizes distributed across said baffle plates.

2. The multi-tube heat transfer apparatus as set forth in claim 1, wherein:
   said baffle plates have two separate regions, said holes in one said region having inner diameters of a first diameter, and said holes in a second said region having inner diameters of a second, different diameter.

3. The multi-tube heat transfer apparatus as set forth in claim 2, wherein:
   said baffle plates have a third region, said holes in said third region having third inner diameters different from said first and second diameters.

4. The multi-tube heat transfer apparatus as set forth in claim 3, wherein:
   the inner diameter of said holes in the respective said regions varies in different said baffle plates, whereby radial flow of the heat transfer fluid in said shell is established between said baffle plates.

5. The multi-tube heat transfer apparatus as set forth in claim 2, wherein:
   the inner diameter of said holes in the respective said regions varies in different said baffle plates, whereby radial flow of the heat transfer fluid in said shell is established between said baffle plates.

6. The multi-tube heat transfer apparatus as set forth in claim 1, wherein:
   said heat transfer tubes have fins thereon extending through the respective said holes of said baffle plates.

7. The multi-tube heat transfer apparatus as set forth in claim 6, wherein said fins are in contact with the inner circumferential portions of said holes for supporting said heat transfer tubes in said shell.

8. The multi-tube heat transfer apparatus as set forth in claim 1, and further comprising an elongated cylindrical body in said shell extending parallel to said heat transfer tubes.

9. The multi-tube heat transfer apparatus as set forth in claim 8, wherein:
   said first inlet and outlet each comprise an annular chamber surrounding said heat transfer tubes;
   said baffle plates located adjacent said first inlet and outlet each have a large central opening corresponding substantially to the diameter of said cylindrical body.

10. The multi-tube heat transfer apparatus as set forth in claim 1, and further comprising a plurality of tubes having closed ends disposed in said cylindrical body shell extending parallel to said heat transfer tubes.

11. The multi-tube heat transfer apparatus as set forth in claim 1, wherein:
    said first inlet and outlet each comprise an annular chamber surrounding said heat transfer tubes.

12. The multi-tube heat transfer apparatus as set forth in claim 11, wherein:
    said annular chamber comprises an annular wall having a plurality of vertical slots extending therearound.

* * * * *